United States Patent [19]

Baldwin

[11] Patent Number: 5,207,542
[45] Date of Patent: May 4, 1993

[54] ADJUSTABLE FIXTURE ARRANGEMENT

[75] Inventor: John B. Baldwin, Warrenville, Ill.

[73] Assignee: Caterpillar Inc., Peoria, Ill.

[21] Appl. No.: 752,373

[22] Filed: Aug. 30, 1991

[51] Int. Cl.⁵ .............................................. B23Q 3/06
[52] U.S. Cl. .................................... 409/226; 269/73;
269/208; 409/221
[58] Field of Search ................ 409/220, 221, 225, 226;
269/73, 91, 111, 156, 208

[56] References Cited

U.S. PATENT DOCUMENTS

| | | | |
|---|---|---|---|
| 682,785 | 9/1901 | Caldwell | 269/208 X |
| 1,372,661 | 3/1921 | Secord | 269/156 |
| 1,471,118 | 10/1923 | Gething | 269/156 |
| 2,565,853 | 8/1951 | Jacobson | 409/220 X |

FOREIGN PATENT DOCUMENTS

| | | | |
|---|---|---|---|
| 1032186 | 6/1958 | Fed. Rep. of Germany | 269/156 |
| 2728587 | 1/1979 | Fed. Rep. of Germany | 269/73 |
| 0163033 | 10/1982 | Japan | 269/208 |

Primary Examiner—Z. R. Bilinsky
Attorney, Agent, or Firm—Alan J. Hickman

[57] ABSTRACT

A fixture arrangement for supporting a plurality of different sizes of workpieces on a table relative to a metal working tool includes an equalizing device, a stop arrangement and a clamping device. The equalizing device positions the workpiece longitudinally on the table, the stop arrangement determines the longitudinal position of the workpiece on the table, and the clamping device secures the workpiece to the table. A guide arrangement guides movement of the equalizing device on the table along the transverse path and a latch device selectively maintains the equalizing device from guided transverse movement. The stop arrangement is connected to an elongated frame of the equalizing device, movable transversely with the equalizing device, and adjustable relative to the elongated frame in the transverse directions. The fixture arrangement is particularly suited for use on a metal working machine.

20 Claims, 7 Drawing Sheets

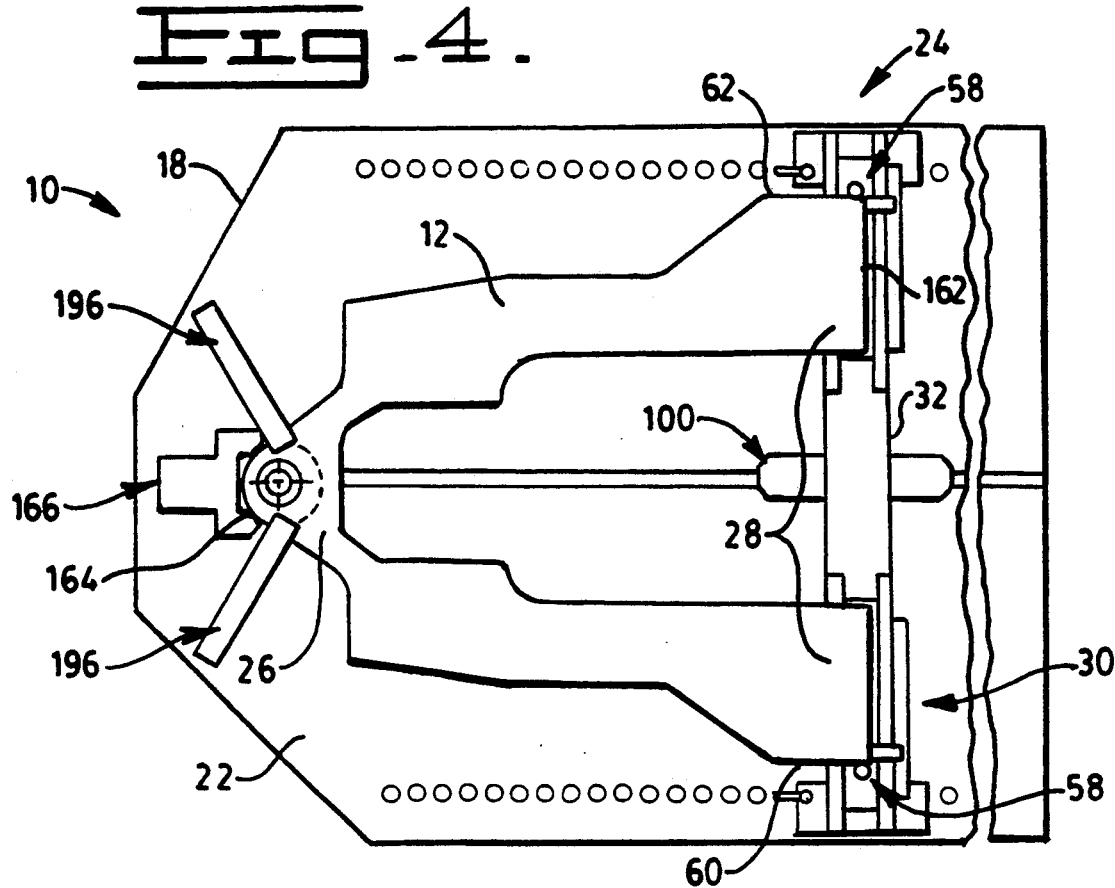
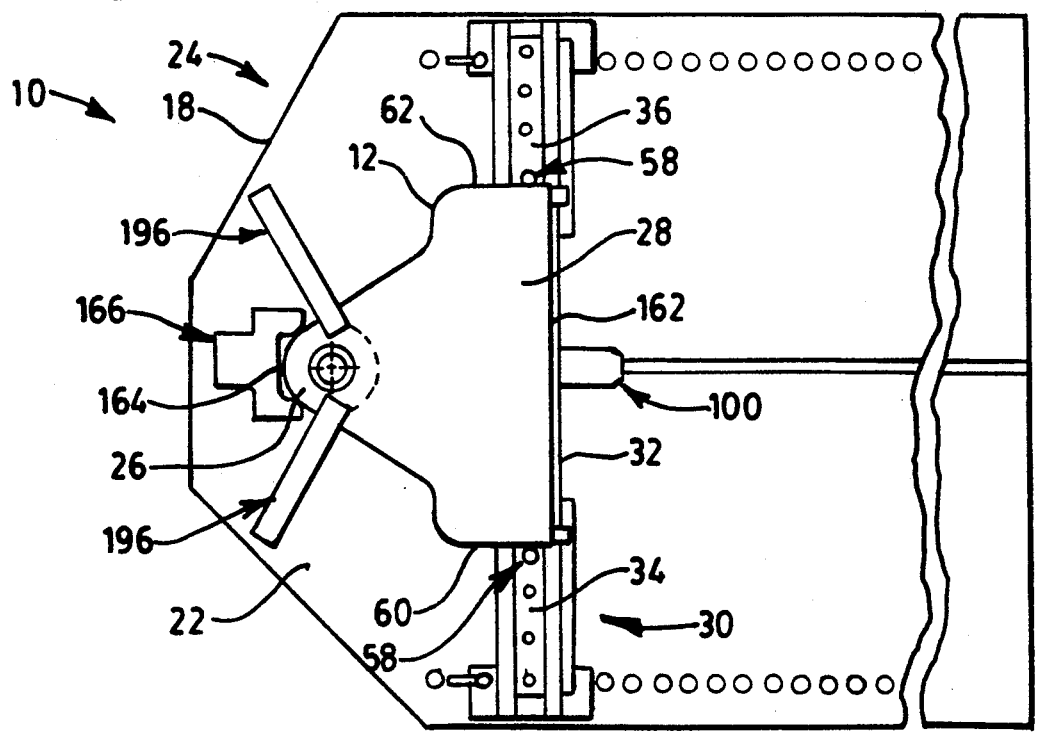

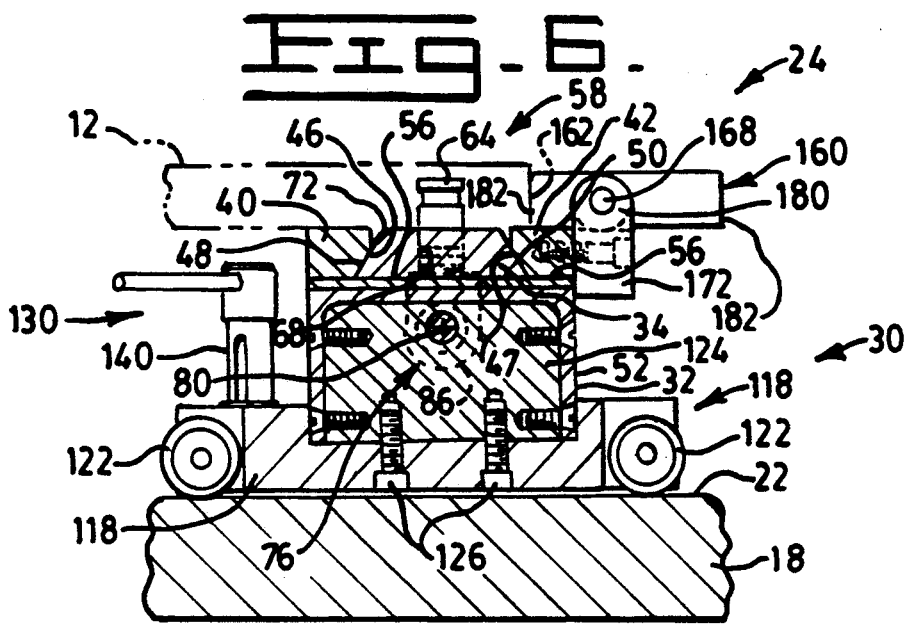

ADJUSTABLE FIXTURE ARRANGEMENT

DESCRIPTION

1. Technical Field

This invention relates to a fixture arrangement for positioning and maintaining work pieces of different sizes and shapes relative to a metal working tool and more particularly to a fixture arrangement having an equalizing device for longitudinally clamping a workpiece, a guide for guiding movement of the equalizing device on the table along a predetermined transverse path, a latch for engaging the table and maintaining the equalizing device from movement along the transverse path, and a stop for engaging an end of the workpiece and maintaining the workpiece from movement in a direction toward the stop.

2. Background Art

Fixtures for positioning and maintaining workpieces relative to a metal working tool are well known in the manufacturing industry. Such fixtures are designed to hold a particular workpiece so that suitable machining of the workpiece may be accomplished. Because workpieces may vary in size and shape, a different fixture is normally required for each different workpiece. The number of fixtures may become substantial and require a sizeable storage area for warehousing the fixtures when not in use.

Because the fixtures are frequently transported between a metal working tool and the storage area, the potential for damage to the fixtures is significant. Similarly, fixtures are frequently attached to and removed from the table of the metal working tool. Because of this activity the potential for damage to the fixture and associated fasteners is probable. Eve under extremely careful fixture handling conditions, the potential for damage thereto is substantial.

Fixtures designed to support a particular workpiece and only that workpiece tend to be expensive based o the fact that engineering design changes to the workpieces being machined are frequent which requires either a new fixture arrangement to be designed and manufactured or extensively modified to suit the particular workpiece.

It has been known to provide equalizing devices for clamping and retaining a particular workpiece on the table of a metal working tool. Such equalizing devices are fixedly attached to the table and not movable on the table to accommodate an assortment of workpieces of differing sizes and shapes.

In applications where the workpiece is to be machined is a steel plate, common practice is to retain the steel plate in position relative to the metal working tool by an abundance of individual clamps spaced about the outer edge of the steel plate. The clamps are secured to the table by virtue of a threaded fastener and lug arrangement which is disposed in a selected one of plurality of T-shaped slots in the table. Since each clamp requires individual placement and adjustment relative to the plate and table, a substantial amount of time is required in setup. Should a large assortment of different sizes and shapes of plates need machining the throughput becomes very low and the efficiency of the machining operation suffers. Such a situation increases the cost of the manufactured product.

The present invention is directed to overcoming one or more of the problems as set forth above.

DISCLOSURE OF THE INVENTION

In one aspect of the present invention, a fixture arrangement for maintaining workpieces of different sizes and shapes at a preselected location on a table of a metal working machine relative to a metal working tool is provided. The fixture arrangement includes an equalizing device having an elongated frame and first and second movable members. A guide is provided for slidably connecting the first and second movable members to the elongated frame and guide the movable members along a predetermined path extending longitudinally relative to the elongated frame. An abutment device connected to the first and second movable members is provided for engaging opposed spaced sides of the workpiece. A drive arrangement moves the first and second movable members along the longitudinal path toward each other and urges the abutment device into engagement with the workpiece. A guide arrangement guides movement of the equalizing device on the table along a predetermined path transverse longitudinal path of movement of the first and second members. A latch engages the table at a selected one of a plurality of preselected locations along the transverse path of movement of the equalizing device and maintains the equalizing device from movement along the predetermined transverse path. A stop connected to the elongated frame of the equalizing device engages an end of the workpiece and maintains the workpiece from movement in a direction toward the stop.

In another aspect of the present invention, a metal working machine for machining a steel plate having first and second spaced sides, first and second spaced ends, and first and second spaced end portions is provided. The metal working machine has a boring tool and a source of rotary power connected to the boring tool and adapted to rotate the boring tool about an axis. A table having a surface oriented transverse the axis of rotation of the boring tool supports the steel plate. A clamp engages the plate first end portion and supports the plate first end portion at a preselected location relative to the axis of rotation of the boring tool on the table. An equalizing device has an elongated frame and first and second movable members slidably connected to the frame. The elongated frame and the first and second movable members are slidably movable on the frame in directions of elongation of the frame. The equalizing device supports the second end portion of the plate on the table. An abutment device connected to the first and second movable members engages opposite sides of the plate. A drive arrangement is adapted for moving the first and second movable members an equal distance in directions toward each other and urging the abutment means into engagement with the first and second sides of the plate. A guide is provided for guiding movement of the equalizing device on the surface of the table along a path oriented transverse to the direction of elongation of the equalizing device. A latch connected to the elongated frame engages the table at a selected one of a plurality of preselected locations on the table and maintains the frame of the equalizing device from movement along the transverse path of movement of the equalizing device on the table surface. A stop connected to the equalizing device engages one of the first and second ends of the plate and maintains the plate for movement in directions toward the stop.

The guide which guides movement of the equalizing device on the table along the predetermined transverse path enables a single equalizing device to be utilized and thereby eliminate the need for a large number of individual clamping devices or the like. The latch which engages the table at a selected one of a plurality of locations along the transverse path of movement of the equalizing device enables the stop to maintain the plate and the equalizing device from movement along the transverse guide and on the table. This feature permits variations in the length of the workpieces to be supported on the table.

Since a plurality of stops of different lengths is provided on the elongated frame accurate adjustment is available. Thus, the end of the workpiece engageable with the stops selected is accurately positioned and maintained from transverse movement toward the stops. This results in accurate positioning of the first end portion of the workpiece relative to the metal working tool.

Since the assortment of workpieces to be formed may differ in length in the directions of transverse movement of the equalizing device, the stops for positioning the different workpieces shall also vary. For each different length of workpiece there is a particular pair of stops. Therefore, the machinist need only select the correct pair of stops for a given piece to be machined. Thus, error and judgement on the part of the operator is minimized since no precision adjustments are required.

Since the latch means includes a plurality of apertures disposed in the table and a pin slidably connected to the elongated frame of the equalizing device positive retention of the equalizing device is achieved.

BRIEF DESCRIPTION OF THE DRAWINGS

FIG. 4 is a diagrammatic top plan view of the fixture arrangement showing one embodiment of a workpiece being held in position;

FIG. 5 is a diagrammatic top plane view of the fixture arrangement showing another embodiment of a workpiece being held in position;

FIG. 6 is a cross sectional view taken along lines 6—6 of FIG. 2 showing a first carriage of the fixture assembly;

FIG. 7 is a view taken along lines 7—7 of FIG. 2 showing an embodiment of a clamp for engaging a first end portion of a workpiece;

BEST MODE FOR CARRYING OUT THE INVENTION

Figure 1:
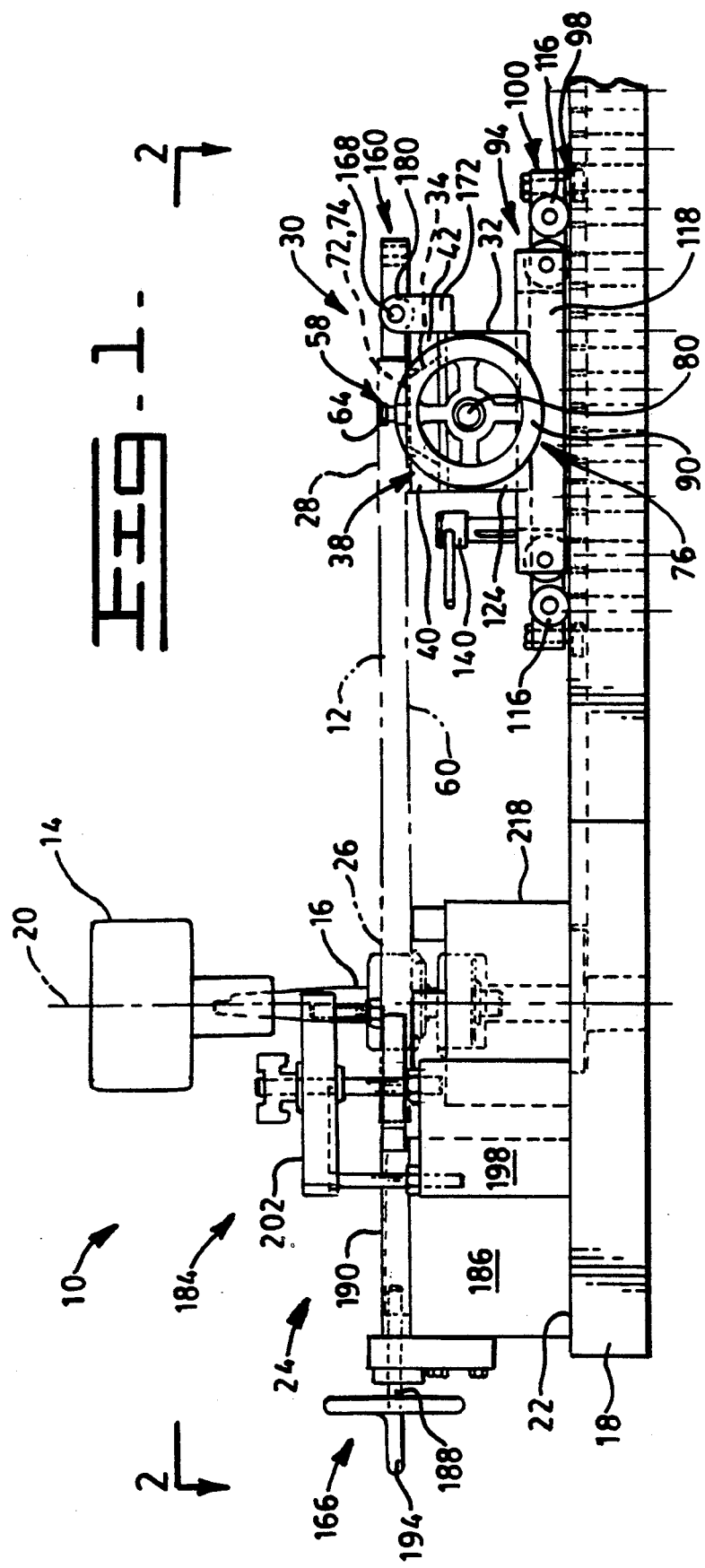
FIG. 1 is a diagrammatic side elevational view of an embodiment of a metal working machine utilizing the fixture arrangement of the present invention.
Figure 2:
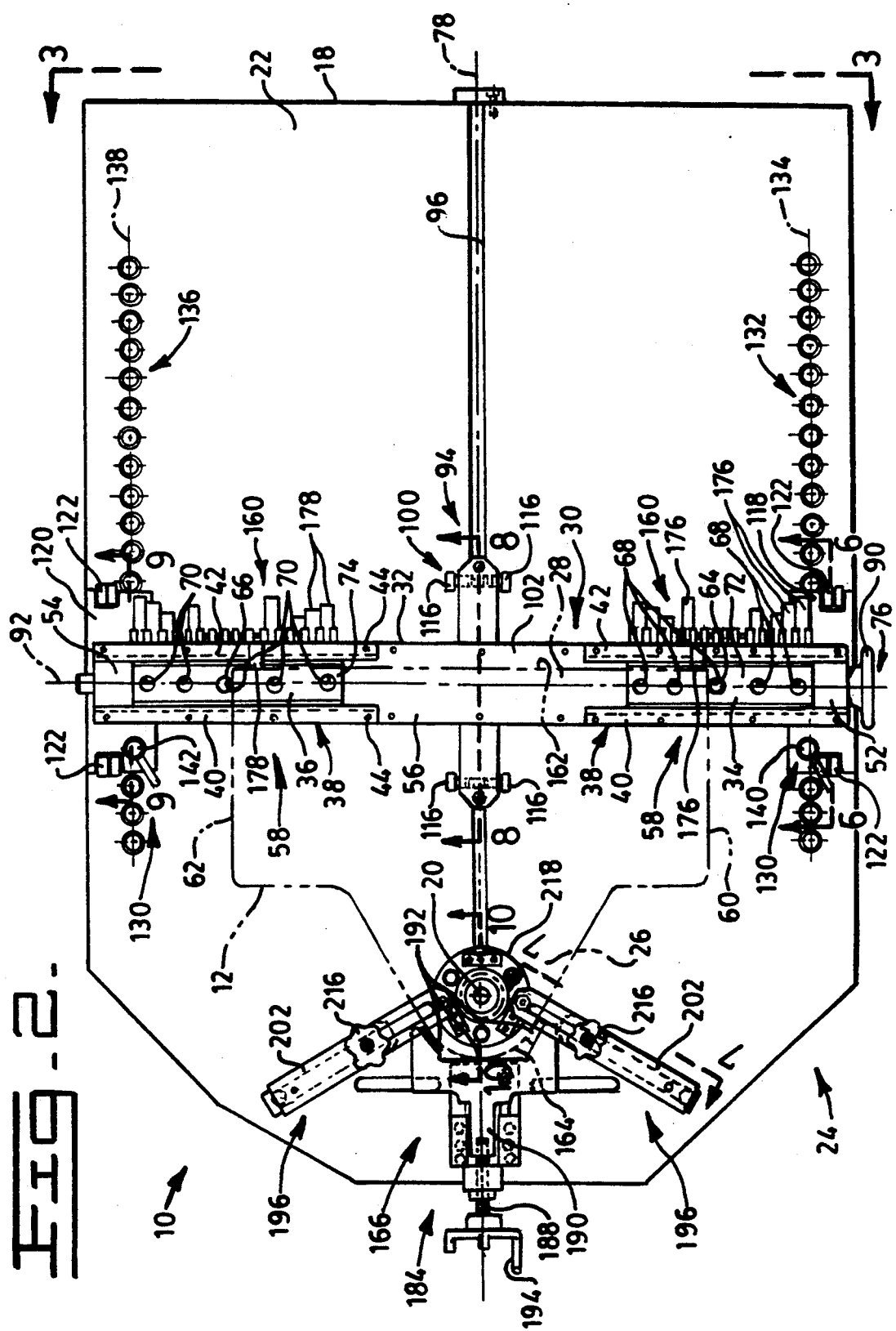
FIG. 2 is a diagrammatic top plan view taken along lines 2—2 of FIG. 1.
Figure 3:
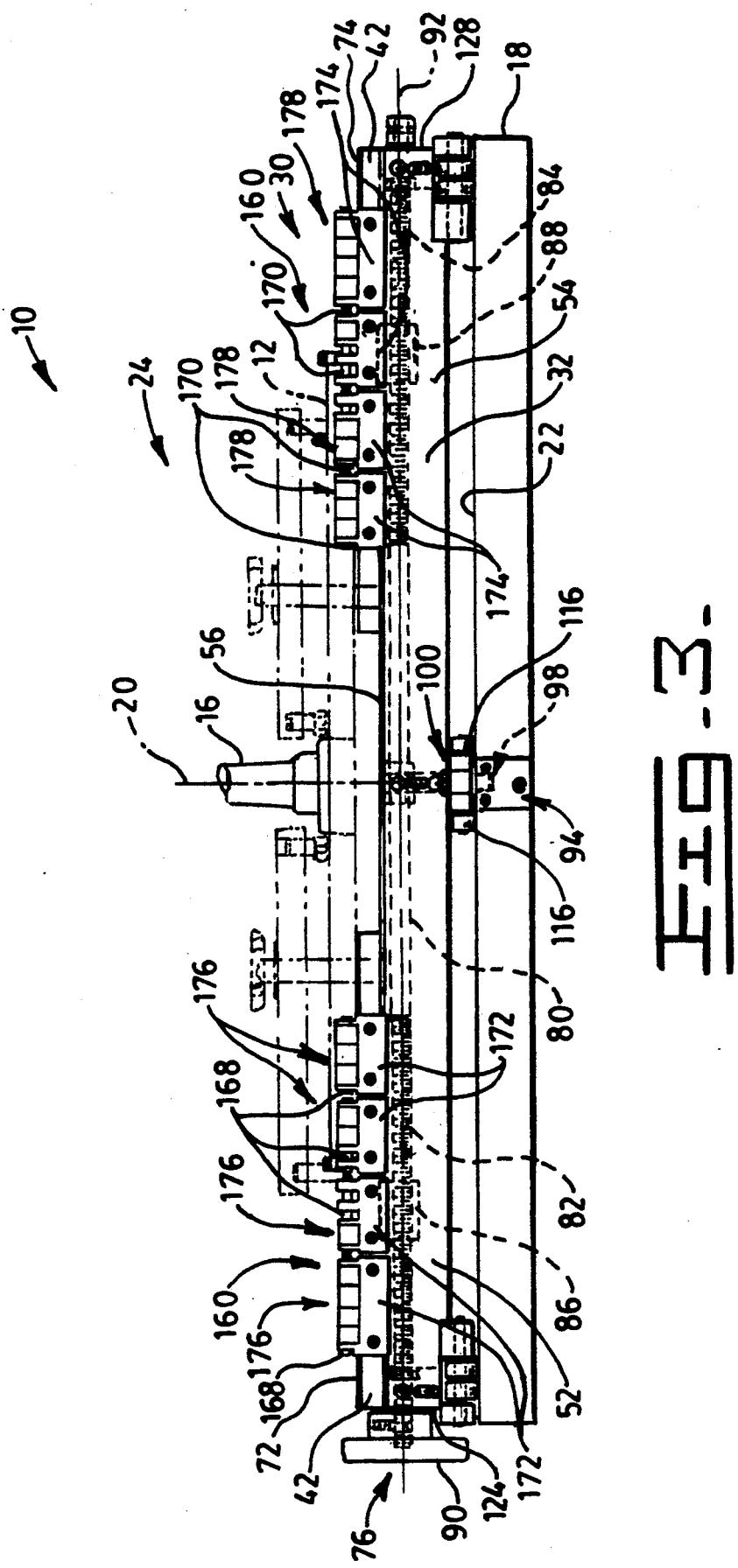
FIG. 3 is an end elevational view taken along lines 3—3 of FIG. 2.

With reference to the drawings and particularly FIGS. 1, 2, and 3, a metal working machine for machining a workpiece 12, for example, a steel plate is disclosed. The metal working machine 10 has a source of rotary power 14, such as an electric motor; a metal working tool 16, for example, a boring tool, connected to the electric motor 14 and rotatable in response to rotation of the electric motor 14; and a table 18 of any suitable configuration. The metal working tool 16 has an axis of rotation 20 which extends transversely relative to a surface 22 of the table 18. Although the axis 20 is shown as being normal to the surface 22 it is to be recognized that the axis could be at any angle required to provide the proper machining direction. Although the preferred metal working tool is a boring tool other tools such as drills, mills, forming rollers, and the like are within the scope of the invention and considered equivalents.

A fixture arrangement 24 is provided for maintaining workpieces 12 of different sizes and shapes at preselected locations on the table 18 relative to the metal working tool 16. As best seen in FIGS. 4 and 5, the fixture arrangement 24 is shown supporting and locating two of the many different sizes and shapes of steel plates 12 possible relative to the metal working tool 16. In particular, the fixture arrangement 24 supports and maintains the first and second end portions 26,28 of the plates 12 at a predetermined location for accurate machining by the metal working tool 16.

Referring to FIGS. 1-5, the fixture arrangement 24 includes an equalizing device 30 having an elongated frame 32 and first and second movable members 34,36. A means 38 is provided for slidably connecting the first and second movable members 34,36 to the elongated frame 32 and guiding the first and second movable members 34,36 along a predetermined path 40 extending longitudinally relative to the elongated frame 32. The connecting means 38 includes first and second spaced substantially parallel guide rails 40,42 connected to the elongated frame 32 by threaded fasteners 44.

As best seen in FIG. 6 the first and second guide rails 40,42 each have a sloped side 46,47 and the first and second members 34,36 each have first and second spaced sloped sides 48,50. The first sloped side 48 of the first and second movable members 34,36 is engageable with the sloped side 46 of the first guide rail 40 and the second sloped side 50 of the first and second movable members 34,36 is engaged with the sloped side 47 of the second guide rail 42. It should be noted that the first and second guide rails 40,42 are shown as two discretely separate pairs of first and second guide rails 40,42 located at first and second end portions 52,54 of the elongated frame 32, respectively. It should be recognized however that the first and second guide rails 40,42 could extend the full length of the elongated frame 32. The first and second guide rails 40,42 retains the first and second movable members 34,36 on a surface 56 of the elongated frame 32 and guides the first and second movable members 34,36 for the aforementioned longitudinal movement.

An abutment means 58 is provided for engaging first and second opposed spaced sides 60,62 of the work piece. The abutment means 58 includes, but is not limited to, first and second pins 64,66. The pins 64,66 are preferably cylindrical but not limited to being cylindrical as other shapes such as square, hexagonal, octagonal, etc. would be suitable for use. The pins 64,66 have a preselected length and are disposed in a selected one of a plurality of first and second sets of spaced apart apertures 68,70 in the first and second movable members 34,36, respectively. The apertures 68 of the first set are axially parallel to each other and the apertures 70 of the second set are axially parallel to each other. The first and second aperture sets 68,70 preferably axially lie in a common plane extending along the path of longitudinal movement of the first and second movable members 34,36. The apertures of the first and second sets 68,70 open at a surface 72,74 of the first and second movable members 34,36, respectively. The first pin 64 extends a preselected distance past the surface 72 of the first movable member 34 and the second pin 66 extends a preselected distance past the surface 74 of the second movable member 36. The distance of extension of the pins 64,66 is related to the thickness of the workpiece 12 being supported, the particular construction of the first and second movable members 34,36 and their thickness, and the thickness of the first and second guide rails 40,42. The first and second pins 64,66 extend a distance sufficient to engage the first and second sides 60,62 of the workpiece located therebetween.

A drive means 76 is provided for moving the first and second movable members 34,36 along the longitudinal path and in directions toward and away from each other. The drive means 76 moves the first and second movable members 34,36 equally so that accurate positioning of the workpiece 12 disposed between the first and second pins 64,66 may be achieved. It is to be noted that the elongated frame is bisected by a transverse centerline 78 lying along the table 18 and intersecting the axis 20 of the metal working tool 16. Thus the equalizer, by virtue of the first and second movable members 34,36 and the first and second pins 64,66, positions the work piece 12 longitudinally relative to the equalizer 30 so that the work piece is bisected by the transverse axis 78. The drive means 76 urges the abutment means 58 into engagement with the work piece 12 and forcibly holds the work piece second end portion 28 at the proper location.

The drive means 76 includes an elongated shaft 80 having right and left hand screw portions 82,84. First and second couplings 86,88 are screw threadably connected to the right and left hand screw portions 82,84 and connected to the first and second movable members 34,36, respectively. Rotation of the shaft 80 by virtue of the hand wheel 90 causes equal movement of the first and second movable members 34,36 in selected opposite directions depending upon the direction of rotation of the hand wheel 90. The equality of motion of the first and second movable members 34,36 and the speed thereof is a function of the pitch of the right and left hand screw portions 82,84 and the speed of rotation of the shaft 80. It is to be noted that the axis 92 of the elongated shaft 80 is substantially parallel to the longitudinal path of movement of the first and second movable members 34,36.

Means 94 guides movement of the equalizing device on the surface 22 of the table 18 along a predetermined path transverse the longitudinal path of movement of the first and second members 34,36. The guiding means 94 includes a guideway 96 disposed in the table and a guide 98 connected to the elongated frame 32 and disposed in the guideway 96. It should be recognized that it would be appropriate to reverse the guideway 96 and guide 98 without deviating from the invention. The guide 98 is slidably movable along the guideway 96 and maintains movement of the equalizing device 30 along the transverse axis 78 and in directions towards and away from the metal working tool 16.

Figure 8:
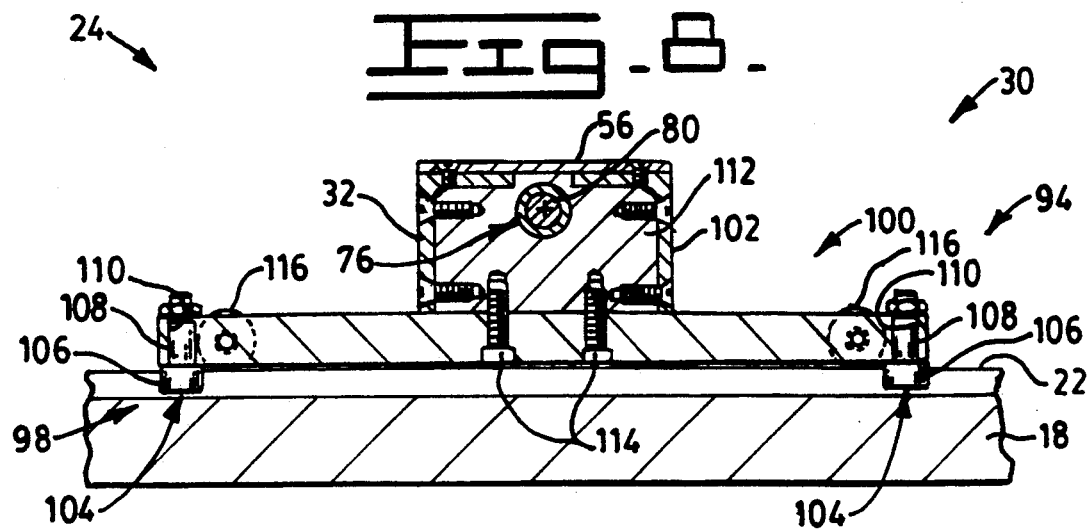
FIG. 8 is a cross sectional view taken along lines 8—8 of FIG. 2 showing the carriage in greater detail.

As best seen in FIGS. 2 and 8 the guiding means 94 includes a carriage 100 of substantially rectangular steel stock. The carriage 100 is affixed to a middle portion 102 of the elongated frame 32. The guide 98 includes but is not limited to a pair of spaced apart guide members 104. The guide members 104 are connected to the carriage 100 and extend into the guideway 96. The guide members 104 have a cylindrical end portion 106 and a shaft 108 disposed in a pair of spaced apertures 110 passing through the carriage 100. The cylindrical end portions 106 may be either fixed or rotatively connected to the shaft 108 The carriage 100 is connected to a gusset 112 mounted in a channel-like opening of the elongated frame 32 by a plurality of threaded fasteners 114.

A plurality of rollers 116 are rotatively connected to the carriage 100 at spaced apart locations on the carriage and rollingly engageable with the surface 22 of the table 18. The rollers 116 support the equalizing device 30 on the table 18 and are radially oriented in directions transverse the directions of movement of the first and second movable members 34,36 so that relatively friction free transverse motion of the elongated frame 32 on the surface 22 may be attained. The rollers 116 are rotatively connected to threaded shafts screw threadably secured to the substantially rectangularly shaped carriage 100.

The guiding means 94 also includes first and second carriages 118,120 connected to the first and second end portions 52,54 of the elongated frame 32, respectively. The first and second carriages 118,120, like carriage 100, each have a plurality of rotatable rollers 122 engageable with the surface 22 of table 18. The first and second carriages 118,120 support the first and second end portions 52,54 of the elongated frame 32 on the table surface 22. The carriages 118,120 assist carriage 100 in providing reduced friction so that relatively smooth rolling motion of the equalizing device 30 transversely on the table 22 may be achieved.

The rollers 122 include two pairs or sets of dual rollers 122 rotatively connected to opposite end portions of each of the first and second carriages 118,120. As best seen in FIG. 6, the first carriage 118 is connected to a first end flange 124 by a plurality of threaded fasteners 126. The first end flange 124 is connected to the first end portion 52 of the elongated frame 32 in any suitable manner, for example, by a plurality of threaded fasteners. Similarly, the second carriage 120 is connected to a second flange 128 by a plurality of threaded fasteners not shown. The second flange 128 is secured to the second end portion 54 of the elongated frame in any suitable manner, for example, by a plurality of threaded fasteners (not shown). The rollers 116 and 122 of the carriage 100 and the first and second carriages 118,120 are substantially axially parallel to each other so that smooth rolling motion of the equalizing device 30 may be provided.

A latch means 130 is provided for engaging the table 18 at a selected one of a plurality of preselected locations along the transverse path of movement of the equalizing device 30 and maintaining the equalizing device 30 from movement along the transverse path. The latch means 130 includes a first plurality of spaced apertures 132 disposed in the table 18 and opening at the table surface 22. The first apertures each have a longitudinal axis which intersects a first line 134 lying along the table surface 22. The line is substantially parallel to the transverse path of travel of the equalizing device 30 on the table 18 and to the axis 78. The longitudinal axis of each of the first apertures 132 are substantially parallel to each other and the first apertures 132 are preferably equally spaced apart. A second plurality of spaced apertures 136 are disposed in the table 18 and opening at the table surface 22. The second apertures 136 each have a longitudinal axis which intersects a second line 138 lying along the surface 22. The second line 138 being substantially parallel to the transverse path of travel of the equalizing device 30 on the table 18 and to the axis 78. The first and second lines 134,138 and the axis 78 are preferably straight.

Figure 9:
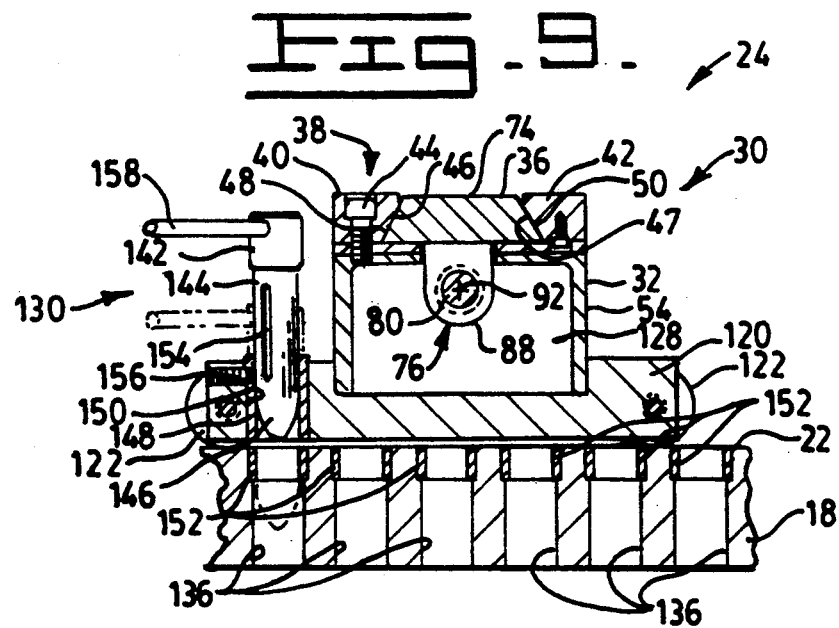
FIG. 9 is a cross sectional view taken along lines 9—9 of FIG. 2 showing a latch means for engaging the table.

The latch means 130 further includes a first pin 140 slidably connected to the elongated frame 32 of the equalizing device 30 and slidably axially movable between a first position at which the first pin 140 is spaced from the table surface 22 and a second position at which the first pin 140 is disposed in a selected one of the first plurality of spaced apertures 132. The latch means 130 also includes a second pin 142 slidably connected to the elongated frame 32 of the equalizing device 30 and slidably axially movable between a first position at which the second pin 142 is disposable in a selected one of the second plurality of spaced apertures 136. The equalizing device 30 is maintained from transverse movement on the table 18 in response to the first and second pins 140,142 being disposed in the selected ones of the first and second plurality of spaced apertures. Preferably, the first and second pins 140,142 are connected to the first and second end portions 52,54 of the elongated frame 32. As best seen in FIGS. 6 and 9, the first and second pins 140,142 are best connected to the first and second carriages 118,120, respectively. Since the first and second pins 140,142 are identical in construction, only the second pin 142 FIG. 9 will be discussed in detail. However, any discussion related to the second pin 142 will also pertain to the first pin 140.

Referring to FIG. 9, pin 142 has a cylindrical body 144 and a bullet or tapered end portion 146. The pin 142 is disposed in a sleeve 148 mounted in a bore 150 disposed in the second carriage 120. The bore 150 extends through the second carriage 120 to allow the cylindrical body 144 which is slidably disposed in the sleeve 148 to move into a selected one of the plurality of second spaced apertures 136 and thereby retain the equalizing device 30 from transverse movement on the table 18. It should be noted that a sleeve 152 is disposed in the first and second plurality of spaced apertures at a location adjacent the surface 22 of the table 18. Thus accuracy and a correct fit between the pin 140,142 and the sleeve 152 is provided. An elongated slot 154 having axial and radial component portions is disposed in the pin 142. The slot 154 is engageable by a guide pin 156 and controls the first and second positions of the pin 142. The radial portion of the elongated slot 154 is provided to maintain the pin 142 in the raised position and the axial portion of the elongated slot 154 is provided for limiting the amount of disposition of the pin 142 in the selected one of the plurality of spaced apertures 136. The pin 142 has a handle 158 to assist in positioning the pin 142 both axially and radially.

Referring to FIGS. 1, 2, 3, and 6, a stop means 160 is provided for engaging a second end of the workpiece 12 and for maintaining the workpiece 12 from movement in a direction toward the stop means 160. The first end 164 of the workpiece 12 is engaged with a variably adjustable stop 166 located in close proximity to the metal working tools 16. The stop means 160 is adjustable in directions transversely of the longitudinal directions of movement of the first and second movable members 34,36 and compensates for variations in the length of the workpiece 12 (the distance between the first and second ends 162,164). Specifically, the stop means 160 includes a plurality of first and second sets of shafts 168,170 connected by a plurality of first and second brackets 172,174, respectively, to the first and second end portions 52,54, respectively, of the elongated frame 32. Preferably, the first and second brackets 172,174 provide a clevis-like structure for supporting a plurality of first and second tabs 176,178 therebetween. The tabs 176,178 each have an end portion 180 an end 182. The tabs 176,178 are connected to one of the shafts 168,170 and each pivotable about the shaft 168,170 to which it is connected. The tabs 176,178 are pivotable between a first position at which they are aligned to engage a workpiece 12 and a second position at which the tabs are spaced from alignment to engage the workpiece 12.

Specifically, the first and second tabs 176,178 are provided in pairs one of the tabs 176 of the pair being connected to one of the first and second shafts 168 and the other tab 178 of the pair being connected to the other of the first and second shafts 170. Each pair of tabs 176,178 has a preselected length defined by the distance between the end 182 and the axis of the shaft 168,170 upon which it is pivotally mounted. Each pair of tabs 176,178 has a length unique from the other pairs of tabs 176,178 and provides the proper positioning of a particular sized and shaped workpiece 12 on the equalizing device 30. That is, the end 182 of the selected pair of tabs 176,178 engages the second end 162 of the workpiece 12. The workpiece 12 is properly positioned in the transverse direction when it is engaged with the end 182 and the variably adjustable stop 166 is engaged with the first end 164 of the workpiece 12.

The length of the pair of tabs 176,178 is determined as a function of the spacing of the first and second apertures 132,136, the length of the particular workpiece 12, and the desired position of the first end 164 of the workpiece relative to the metal working tool 16. Thus, by predetermining the length of the first and second tabs, 176,178 of a pair of tabs, the positioning of the first end portion 26 of a plate, relative to the workpiece 12 in the transverse direction, is determined. It is to be noted that, the first and second shafts 168,170 are axially oriented in the longitudinal direction of movement of the first and second movable members 34,36 and parallel to the longitudinal path of movement so that the second end 162 of the workpiece 12 is maintained parallel to the longitudinal axis 92.

Because the spacing between adjacent ones of the plurality of first apertures 132 is equal, the spacing between the adjacent ones of the second plurality of spaced apertures 136 is equal, and the spacing of the first and second apertures 132,136 are equal to each other, the longitudinal axis 92 of equalizer is maintained perpendicular to the guideway 96 when the first and second pins 140,142 are engaged in the first and second apertures 132,136.

A clamping means 184 which includes the variable adjustable stop 166 engages the plate first end portion 26 and supports the plate first end portion 26 at a preselected location on the table 18 relative to the axis 20 of rotation of the metal working tool 16. As best seen in FIGS. 1 and 2, the variably adjustable stop 166 includes a base 186 mounted on the table 18, a shaft 188 screw threadably connected to the base, and a positionable member 190 connected to the shaft 188. The positionable member 190 has a workpiece engaging end portion 192 which has a configuration suitable for cradling the first end of the workpiece 12. A hand crank or wheel 194 is connected to the shaft 188 and is provided for rotating the shaft 188 and thereby moving the workpiece engaging end portion 192 along an axis of the shaft 188. The base 186 guidably supports the workpiece engaging end portion 192 for linear movement axially of the shaft 188. Movement of the workpiece engaging end portion 192 towards the workpiece 12 urges the workpiece 12 into forceable engagement with the spaced apart pair of first and second tabs 176,178. The clamping means 184 thus maintains the workpiece 12 against the tabs 176,178 and in position for machining.

As best seen in FIGS. 1, 2, and 7, a pair of clamps 196 are connected to the table 18 at spaced apart locations on the table 18 adjacent the first end portion 26 of the workpiece 12 and the metal working tool 16. The pair of clamps 196 are identical in construction and therefore only one of the two clamps will be discussed in any detail. However, any discussion related to one also relates to the other.

Referring to FIG. 7, clamp 196 includes a base member 198 connected to the table 18 by a threaded fastener 200. A lever arm 202 is pivotally connected to the base 198 and engageable with the first end portion 26 of the workpiece 12. The lever arm 202 has first and second end portions 204,206 and is adjustable in length in order to accommodate a large array of workpieces 12 of differing sizes and shapes. The first end portion 204 is engageable with a pivot member 208 attached to the base 198 and the second end portion 206 has an adjustable workpiece engaging member 210 adjustably connected thereto. A force applying device 212 having a threaded shaft 214 screw threadably engaged with the base 198 and a handle 216 connected to the threaded shaft 214 is positioned between the first and second end portions 204,206 of the lever arm. The handle 216 is suitable for rotating the threaded shaft 214 and moving the lever arm 202 about the pivot member 208 and into forcible engagement with the workpiece 12. The handle 216 also serves to maintain telescopic portions of the lever arm 202 at the desired selected length. A support 218, pilot positioned between the workpiece 12 and surface of the table 22, supports the plate 12 thereon. The clamps 196 serve to urge the workpiece 12 against the support 218 and prevent inadvertent elevational movement of the workpiece 12. It should be noted that the workpiece is supported on both the support 218 and the first and second guide rails 40,42 of the equalizing device, and the support 218 and first and second guide rails 40,42 maintains the workpiece substantially parallel to the surface 22 of the table 18.

Figure 10:
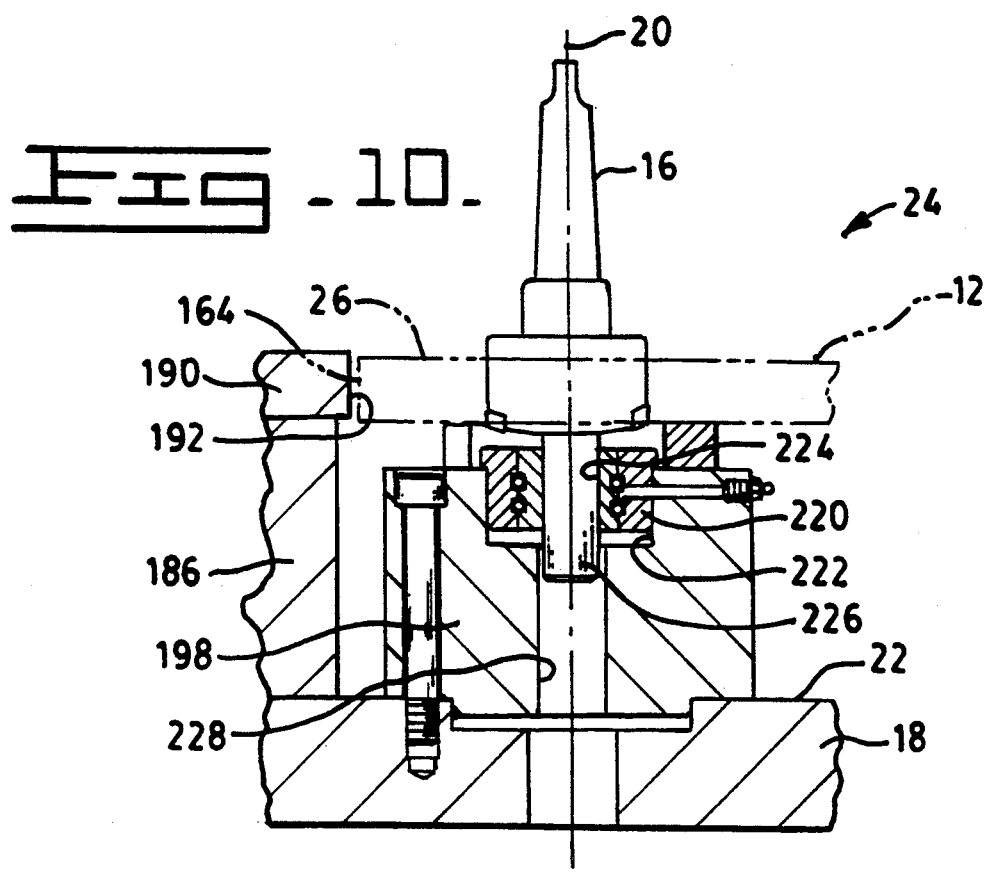
FIG. 10 is a cross sectional view taken along lines 10—10 of FIG. 2 showing a pilot bushing for guiding a boring tool.

As best seen in FIG. 10, a pilot bearing 220 is disposed in a counter bore bore 222 in the support 218 and retained therein in any suitable manner such as by press fit, clamping, or any other suitable well known manner. The pilot bearing 220 has a central bore 224 disposed therethrough. The central bore 224 is axially aligned with an axis 20 of the metal working tool 16 and guidably supportably receives a stub shaft 226 extending from an end of the metal working tool 16. A through bore 228, axially aligned with and opening in the counterbore 222, is provided in the support 218 provide clearance to permit the stub shaft 226 to extend through the central bore 224 and past the counter bore 222. The pilot bearing 220 is preferably an antifriction bearing of any suitable construction capable of satisfactorily carrying radial loads placed on the metal working tool 16 during the metal working operation.

INDUSTRIAL APPLICABILITY

With reference to the drawings, positioning and retention of a workpiece 12 relative to the metal working tool 16 is achieved simply, easily, and without requiring an excessive amount of setup time or without requiring individual fixtures for each different sized or shaped workpiece 12 to be machined.

To properly position a workpiece 12 on the table 18 relative to the metal working tool one simply rolls the the equalizing device 30 on the table surface 22 and along the transverse path defined by the guide way 96 to a desired location as determined by work piece length. Since the position of the equalizer on the table 18 is a function of the spacing of the first and second apertures 132,136, the exact desired location of the equalizer is not attainable. A position close to the desired location is thus selected, and the first and second pins 140,142 are moved by way of the handle 158 into their adjacent corresponding first and second apertures 132,136. It is to be noted that the guide way 96 and guide members 104 maintain the elongated frame 32 of the equalizing device substantially perpendicular to the transverse path of travel and thus the first and second pins 140,142 engage the proper corresponding ones of the first and second plurality of apertures 132,136.

In order to accurately locate the workpiece 12 relative to the metal working tool 16 the second end 162 of the workpiece 12 must be properly positioned. In order to achieve this proper positioning a predetermined tab of each of the first and second sets of tabs 176,178 is selected. Since the first and second sets of tabs 176,178 each have a tab of identical length, the proper pair of tabs 176,178 having the same length, one in each set, is selected and moved to the first position at which the the tabs 176,178 are aligned to engage the second end 162 of the workpiece 12. The workpiece 12 is then placed on the equalizing device 30 and support 218 and slid in position against the aligned tabs.

The position of the workpiece 12 in the longitudinal direction of movement of the first and second movable members 34,36 is now addressed. To achieve the proper longitudinal positioning, the first and second pins 64,66 of the equalizing device are disposed in an appropriate one of the apertures of the first and second set of apertures 68,70 and the first and second movable members 34,36 are moved in a longitudinal direction toward each other until the first and second pins 64,66 engage the first and second sides 60,62, respectively, of the workpiece 12. Movement of the first and second movable members 34,36 is achieved by simply rotating the hand wheel 90 in the proper direction. It should be noted that the appropriate apertures of the first and second set of apertures 68,70 is a function of the size of the workpiece 12 and the geometry thereof. The workpiece 12 is now accurately positioned transversely and longitudinally relative to the metal working tool.

In order to maintain the workpiece 12 at this proper location the positionable member 190 is moved into engagement with the first end 164 of the workpiece 12 by way of the crank like hand wheel 194 and the pair of clamps 196 into clamping engagement with the first end portion 26 of the workpiece.

Other aspects, objects and advantages of the present invention can be obtained from a study of the drawings, the disclosure and the appended claims.

I claim:

1. A fixture arrangement for maintaining workpieces of different sizes and shapes at preselected locations on a table of a metal working machine relative to a metal working tool, said workpieces each having opposed spaced sides and an end, comprising:

an equalizing device having an elongated frame and first and second movable members;

means for slidably connecting the first and second movable members to the elongated frame and guiding said movable members along a predetermined path extending longitudinally relative to said elongated frame;

abutment means for engaging opposed spaced sides of a workpiece, said abutment means being connected to said first and second movable members;

drive means for moving said first and second movable members along said longitudinal path toward each other and urging said abutment means into engagement with said workpiece;

means for guiding movement of said equalizing device on the table along a predetermined path transverse the longitudinal path of movement of the first and second members, said guiding means including a guideway disposed in one of the table and elongated frame, a guide connected to the other of the table and elongated frame and being slidably disposed in and movable along the guideway, and a carriage connected to said elongated frame and rollingly supporting said elongated frame on said table;

latch means for engaging said table at a selected one of a plurality of preselected locations along the transverse path of movement of said equalizing device and maintaining said equalizing device from movement along said predetermined transverse path;

stop means for engaging an end of said workpiece and maintaining said workpiece from movement in a direction toward said stop means, said stop means being connected to the elongated frame of said equalizing device.

2. A fixture arrangement, as set forth in claim 1, wherein said first and second movable members each have a plurality of spaced apertures disposed therein and a surface, said abutment means includes a pair of cylindrical pins of a preselected length, one of said pins being disposed in a selected one of a plurality of said apertures in the first movable member and another of the pins being disposed in a selected one of the apertures of the second movable member, said pins extending from the apertures and past the surfaces a preselected distance, said pins being adapted to engage a workpiece supported on said equalizing device and disposed between said pair of pins.

3. A fixture arrangement, as set forth in claim 2, wherein said slidable connecting means includes first and second spaced substantially parallel guide rails connected to the elongated frame, said first and second members being disposed between and engageable with the first and second guide rails.

4. A fixture arrangement, as set forth in claim 3, wherein said first and second guide rails each have a sloped side and said first and second members each have first and second spaced sloped sides, the first sloped side of the first and second members being engaged with the sloped side of the first guide rail and the second sloped side of the first and second members being engaged with the sloped side of the second guide rail, said first and second guide rails maintaining said first and second members slidably on the elongated frame.

5. A fixture arrangement, as set forth in claim 1, wherein said table has a surface and said latch means including:

a first plurality of spaced apertures disposed in said table and opening at the surface of the table, said first apertures having a longitudinal axis and said longitudinal axis of the first apertures intersecting a first line lying along the surface of the table, said first line being substantially parallel to the transverse path of travel of the equalizing device on the table; and a first pin slidably connected to the elongated frame of the equalizing device and slidably axially movable between a first position at which the first pin is spaced from the table and a second position at which the first pin is disposable in a selected one of the first plurality of apertures in the table, said equalizing device being maintained from said transverse movement on the table in response to the first pin being disposed in an aperture.

6. A fixture arrangement, as set forth in claim 5, wherein said elongated frame has first and second spaced end portions, and said first pin being slidably connected to the first end portion of the elongated frame, said latch means including:

a second plurality of spaced apertures disposed in said table and opening at the surface of the table, said second apertures having a longitudinal axis and said longitudinal axis of the second apertures intersecting a second line lying along the surface of the table, said second line being substantially parallel to the transverse path of travel of the equalizing device on the table and spaced from the first line; and a second pin slidably connected to the second end portion of the elongated frame of the equalizing device and slidably axially movable between a first position at which the second pin is spaced from the table and a second position at which the second pin is disposable in a selected one of the second plurality of apertures in the table, said equalizing means being maintained from said transverse movement on the table in response to the second pin being disposed in an aperture.

7. A fixture arrangement, as set forth in claim 5, wherein adjacent ones of said plurality of first apertures disposed in said table are equally spaced apart a preselected distance and said stop means being adjustable to engage an end of a workpiece located between an adjacent pair of said plurality of apertures.

8. A fixture arrangement, as set forth in claim 1, wherein said stop means being adjustable in directions transversely of the longitudinal directions of movement of the first and second movable members.

9. A fixture arrangement, as set forth in claim 8, wherein said stop means includes a shaft connected to said elongated frame and a plurality of tabs of different lengths pivotally connected at an end portion of the tab to said shaft, said shaft being axially oriented in said longitudinal directions of movement of the first and second members and said tabs each being pivotally movable about said shaft between a first position at which said tabs are aligned to engage a workpiece and a second position at which said tabs are spaced from alignment to engage a workpiece.

10. A fixture arrangement for maintaining workpieces of different sizes and shapes at preselected locations on a table of a metal working machine relative to a metal working tool, comprising:

an equalizing device having an elongated frame and first and second movable members;

means for slidably connecting the first and second movable members to the elongated frame and guiding said movable members along a predetermined path extending longitudinally relative to said elongated frame;

abutment means for engaging opposed spaced sides of the workpiece, said abutment means being connected to said first and second movable members;

drive means for moving said first and second movable members along said longitudinal path toward each other and urging said abutment means into engagement with said workpiece;

means for guiding movement of said equalizing device on the table along a predetermined path transverse the longitudinal path of movement of the first and second members, said guiding means including a guideway disposed in the table and a guide connected to the elongated frame and being disposed in the guideway, said guide being movable in directions transverse the longitudinal directions of movement of the first and second movable members, said guiding means including a carriage and said guide including first and second spaced guide members connected to the carriage and disposed in the guideway;

a plurality of rollers rotatively connected to the carriage and rollingly engageable with the table, said rollers supporting said equalizing device on the table and being radially oriented in directions transverse the directions of movement of the first and second movable members;

latch means for engaging said table at a selected one of a plurality of preselected locations along the transverse path of movement of said equalizing device and maintaining said equalizing device from movement along said predetermined transverse path;

stop means for engaging an end of said workpiece and maintaining said workpiece from movement in a direction toward said stop means, said stop means being connected to the elongated frame of said equalizing device.

11. A fixture arrangement for maintaining workpieces of different sizes and shapes at preselected locations on a table of a metal working machine relative to a metal working tool, comprising:

an equalizing device having an elongated frame and first and second movable members, said elongated frame having first and second spaced end portions and a middle portion;

means for slidably connecting the first and second movable members to the elongated frame and guiding said movable members along a predetermined path extending longitudinally relative to said elongated frame;

abutment means for engaging opposed spaced sides of the workpiece, said abutment means being connected to said first and second movable members;

drive means for moving said first and second movable members along said longitudinal path toward each other and urging said abutment means into engagement with said workpiece;

means for guiding movement of said equalizing device on the table along a predetermined path transverse the longitudinal path of movement of the first and second members, said guiding means including a guideway disposed in the table and a guide connected to the elongated frame, said guide being disposed in the guideway and slidably movable in said guideway in directions transverse the longitudinal directions of movement of the first and second movable members;

a carriage connected to the middle portion of the elongated frame and a plurality of spaced rollers rotatively connected to the carriage and engageable with the table;

a first carriage connected to the first end portion of the elongated frame and a plurality of spaced rollers rotatively connected to the first carriage and engageable with the table; and a second carriage connected to the second end portion of the elongated frame and a plurality of spaced rollers rotatively connected to the second carriage and engageable with the table, said rollers of the carriage, first carriage and second carriage being substantially axially parallel to each other;

latch means for engaging said table at a selected one of a plurality of preselected locations along the transverse path of movement of said equalizing device and maintaining said equalizing device from movement along said predetermined transverse path;

stop means for engaging an end of said workpiece and maintaining said workpiece from movement in a direction toward said stop means, said stop means being connected to the elongated frame of said equalizing device.

12. A fixture arrangement, as set forth in claim 11, wherein said guide is mounted on the carriage and extends from the carriage into the guideway.

13. A fixture arrangement, as set forth in claim 11, wherein said table has a surface and said latch means including:

a first plurality of spaced apertures disposed in said table and opening at the surface of the table, said first apertures having a longitudinal axis and said longitudinal axis of the first apertures intersecting a first line lying along the surface of the table, said line being substantially parallel to the transverse path of travel of the equalizing device on the table; and a second plurality of spaced apertures disposed in said table and opening at the surface of the table, said second apertures having a longitudinal axis and said longitudinal axis of the second apertures intersecting a second line lying along the surface of the table, said second line being substantially parallel to the transverse path of travel of the equalizing device on the table and spaced from the first line; and a first pin slidably connected to the first carriage and slidably axially movable between a first position at which the first pin is spaced from the table and a second position at which the first pin is disposable in a selected one of the first plurality of apertures in the table.

a second pin slidably connected to the second carriage and slidably axially movable between a first position at which the second pin is spaced from the table and a second position at which the second pin is disposable in a selected one of the second plurality of apertures in the table, said equalizing device being maintained from transverse movement in response to said first and second pins being disposed in the first and second selected apertures, respectively, in said table.

14. A fixture arrangement for maintaining workpieces of different sizes and shapes at preselected locations on a table of a metal working machine relative to a metal working tool, said table having a surface, and comprising:

an equalizing device having an elongated frame and first and second movable members;

means for slidably connecting the first and second movable members to the elongated frame and guiding said movable members along a predetermined path extending longitudinally relative to said elongated frame;

abutment means for engaging opposed spaced sides of the workpiece, said abutment means being connected to said first and second movable members;

drive means for moving said first and second movable members along said longitudinal path toward each other and urging said abutment means into engagement with said workpiece;

means for guiding movement of said equalizing device on the table along a predetermined path transverse the longitudinal path of movement of the first and second members;

stop means for engaging an end of said workpiece and maintaining said workpiece from movement in a direction toward said stop means, said stop means being connected to the elongated frame of said equalizing device;

latch means for engaging said table at a selected one of a plurality of preselected locations along the transverse path of movement of said equaling device and maintaining said equalizing device from movement along said predetermined transverse path, said latch means having a plurality of spaced first apertures disposed in said table and opening at the surface of the table, said first apertures having a longitudinal axis, said longitudinal axis of the first apertures intersecting a first line lying along the surface of the table, said first line being substantially parallel to the transverse path of travel of the equalizing device on the table, a first pin slidably connected to the elongated frame of the equalizing device and slidably axially movable between a first position at which the first pin is spaced from the table and a second position at which the first pin is disposable in a selected one of the first apertures, said equalizing device being maintained from said transverse movement on the table in response to the first pin being disposed in one of said first apertures, said first apertures being equally spaced apart a preselected distance and said stop means being adjustable to engage an end of a workpiece located between an adjacent pair of said first plurality of apertures; and stop means for engaging an end of said workpiece and maintaining said workpiece from movement in a direction toward said stop means, said stop means being connected to the elongated frame of said equalizing device; said stop means having a shaft and a plurality of tabs, said shaft being connected to said elongated frame and axially oriented in said longitudinal directions of movement of the first and second members, said plurality of tabs of different lengths each having an end portion and being pivotally connected at the end portion to said shaft, said tabs each being pivotally movable about said shaft between a first position at which said tabs are aligned to engage a workpiece positioned between said abutment means and a second position at which said tabs are spaced from alignment to engage a workpiece positioned between said abutment means.

15. A metal working machine for machining a steel plate having first and second spaced sides, first and second spaced ends, and first and second spaced end portions, said metal working machine having a metal working tool, a source of rotary power connected to said metal working tool, said metal working tool being rotatable about an axis, comprising:

a table having a surface, said surface being oriented transverse the axis of rotation of said metal working tool;

clamping means for engaging the plate first end portion and supporting the plate first end portion at a preselected location relative to the axis of rotation of said metal working tool and on the table, an equalizing device having a frame and first and second movable members slidably connected to the frame, said frame being elongated and said first and second movable members being slidably movable on said frame in directions of elongation of said frame, said elongated frame having first and second spaced end portions and a middle portion, said equalizing device being supported on said table surface and supporting the second end portion of the plate;

abutment means for engaging first and second sides of the plate, said abutment means being connected to said first and second movable members;

drive means for moving said first and second movable members an equal distance in directions toward each other and urging said abutment means into engagement with the first and second sides of the plate and the plate second end portion to a preselected location on the table, said drive means being connected to the frame and first and second movable members;

guide means for guiding movement of said equalizing device on the surface of said table along a path oriented transverse to the direction of elongation of said equalizing device, said guide means including a guideway disposed in the table, extending in said transverse direction and opening at said table surface, a carriage having a plurality of rollers and a guide, said carriage being connected to the middle portion of the elongated frame, said rollers being rollingly engaged with the table surface, said guide being slidably disposed in the guideway and guiding said equalizing device along said guideway, a first carriage having a plurality of rollers, said first carriage being connected to the first end portion of the elongated frame, said first carriage rollers being rollingly engaged with the table surface, a second carriage having a plurality of rollers, said second carriage being connected to the second end portion of the elongated frame, said second carriage rollers being rollingly engaged with the table surface, said carriages supporting the equalizing device on the surface of the table and said rollers providing smooth transverse rolling motion of the equalizing device on said table surface;

latch means for engaging said table at a selected one of a plurality of preselected locations on the table and maintaining said frame of the equalizing device from movement along the transverse path of movement of the equalizing device on the table surface, said latch means being connected to the elongated frame;

stop means for engaging the second end of said plate and maintaining said plate from movement in a direction toward said stop means, said stop means being connected to said equalizing device.

16. A metal working machine, as set forth in claim 15, wherein said guide means includes a guideway disposed in the table, opening at the table surface, and extending in said transverse direction, and a guide connected to said elongated frame and being disposed in said guideway, said latch means including:

a plurality of first spaced apertures disposed in the table and opening at the table surface, said first apertures lying along a first line parallel to the transverse direction of orientation of the guideway, a plurality of second spaced apertures disposed in the table and opening at the table surface, said second apertures lying along a second line parallel to the transverse direction of orientation of the guideway;

first and second pins slidably connected to the elongated frame at spaced apart locations on the elongated frame, said first and second pins each being movable between a first position at which the pins are spaced from the table surface and a second position at which the first pin is disposed in one of the first apertures and the second pin is disposed in an associated one of the second apertures, said first and second pins maintaining said equalizing device from movement on said table surface and along said transverse path in response to being disposed in said apertures.

17. A metal working machine, as set forth in claim 16, wherein the spacing between adjacent ones of the plurality of first spaced apertures is equal in magnitude to the spacing between corresponding adjacent ones of the plurality of second spaced apertures.

18. A metal working machine, as set forth in claim 15, wherein said abutment means includes:

a pair of abutment pins; and a plurality of spaced apertures disposed in the first and second members, one of said abutment pins being disposed in a selected one of the plurality of apertures in said first member and an other of said abutment pins being disposed in a selected one of the plurality of apertures in the second member, said pair of abutment pins extending from the first and second members and said steel plate being disposed between the pair of abutment pins, one of the abutment pins of said pair being engageable with the first side of the steel plate and the other abutment pin of said pair being engageable with the second side of the steel plate.

19. A metal working machine for machining a steel plate having first and second spaced sides, first and second spaced ends, and first and second spaced end portions, said metal working machine having a metal working tool, a source of rotary power connected to said metal working tool, said metal working tool being rotatable about an axis, comprising;

a table having a surface, said surface being oriented transverse the axis of rotation of said metal working tool;

clamping means for engaging the plate first end portion and supporting the plate first end portion at a preselected location on the table relative to the axis of rotation of said metal working tool;

an equalizing device having a frame and first and second movable members slidably connected to the frame, said frame being elongated and said first and second movable members being slidably movable on said frame in directions of elongation of said frame, said equalizing device being supported on said table surface and supporting the second end portion of the plate;

abutment means for engaging first and second sides of the plate, said abutment means being connected to said first and second movable members;

drive means for moving said first and second movable members an equal distance in directions toward each other and urging said abutment means into engagement with the first and second sides of the plate and maintaining the plate second end portion at a preselected location on the table, said drive means being connected to the frame and first and second movable members;

guide means for guiding movement of said equalizing device on the surface of said table along a path oriented transverse to the direction of elongation of said equalizing device;

latch means for engaging said table at a selected one of a plurality of preselected locations on the table and maintaining said frame of the equalizing device from movement on the table surface along the transverse path of movement of the equalizing device, said latch means being connected to the elongated frame;

stop means for engaging the second end of said plate and maintaining said plate from movement in a direction toward said stop means, said stop means being connected to said equalizing device, said stop means including;

first and second shafts connected to the first and second end portions of the elongated frame, respectively; and a plurality of first tabs having an end portion and an end and being pivotally connected at the end portion to the first shaft, said first tabs each having a preselected length of different magnitudes, said first tabs each being pivotally movable about the shaft between a first position at which the end of the first tabs are aligned to engage the second end of the steel plate and a second position at which the end of the first tabs are spaced from being aligned to engage the second end of the steel plate; and a plurality of second tabs having an end portion and an end and being pivotally connected at the end portion to the second shaft, said second tabs each having a preselected length of different magnitudes, said second tabs each being pivotally movable about the shaft between a first position at which the end of the second tabs are aligned to engage the second end of the steel plate and a second position at which the end of the second tabs are spaced from being aligned to engage the second end of the steel plate.

20. A metal working machine, as set forth in claim 19, wherein each of the first tabs has a corresponding second tab of equal preselected length.

* * * * *